Patented Oct. 13, 1953

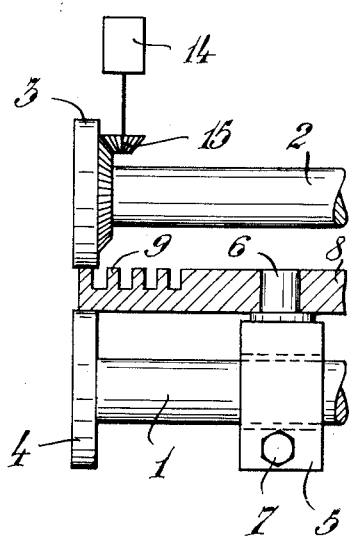
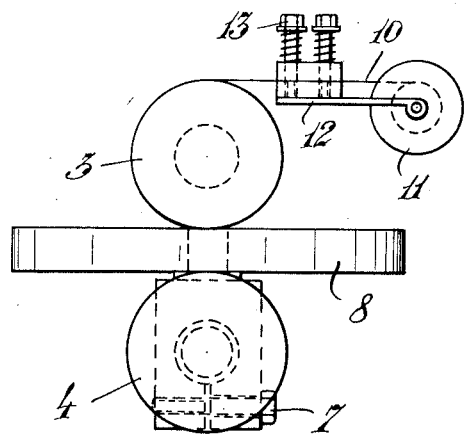
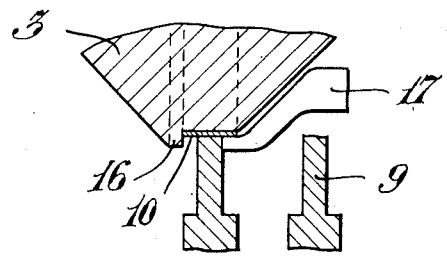

2,655,584

UNITED STATES PATENT OFFICE 2,655,584

MEANS FOR APPLYING SEALING BANDS TO LABYRINTH PACKING DISKS

Per Gottfrid Lange and Ragnar Olov Jacob Möller, Finspong, Sweden

Application May 12, 1952, Serial No. 287,432
In Sweden July 3, 1951

4 Claims. (Cl. 219—4)

This invention relates to a method of and means for applying radially projecting sealing bands to axially projecting concentric, annular ribs of labyrinth packing discs. The common practice hitherto used for applying such sealing bands involves inserting the sealing bands into grooves of the ribs and securing them therein by means of a caulking wire.

The present invention has for its object to provide an improved method of applying and fastening the sealing bands and a mechanism for carrying the method into effect.

According to a feature of the invention a sealing band is unrolled from a magazine by means of a roller which also acts as an electrode of a welding machine and fastens the band to the circular top surface of a rib of the labyrinth disc by a spot or seam welding operation, while the disc is revolved at a speed which in respect of the rib under treatment agrees with the circumferential speed of the roller. As a result of this feature the formation of grooves in the ribs is eliminated and this in its turn eliminates the corrosion which in case of grooves often appears at the thin edges of the grooves. As a further result of the invention the thickness of the ribs and thus also the pitch or division may be reduced. It is thus possible, within a given diameter of a labyrinth disc, to provide an increased number of sealing points and accordingly reduce the leakage.

Another advantage of the invention is that replacement of worn sealing bands may take place more times than was hitherto possible because of the fact that there are no groove edges which run the risk of being deformed at the removal of a worn out band and insertion of another band. Still another advantage results from the welding operation, which gives the sealing band a more favourable position from strength point of view owing to the fact that a larger portion of the area of the sealing band is fastened to the rib. It is thus seen that the welding operation presents obvious advantages over the caulking operation. From the worker's standpoint, however, the caulking operation is considered a simple and ready method. Thus, the problem was to find out a welding method which might compete with the caulking method also from production point of view. By the present invention a welding method is found which also from manufacturing point of view has proved better than the caulking method.

In the accompanying drawing a mechanism for carrying the method into effect is illustrated.

Fig. 1 is an axial section of said mechanism;

Fig. 2 is a side elevation thereof and,

Fig. 3 is a section on a larger scale of a portion of the mechanism shown in Fig. 1 with certain details added.

With reference to the drawing, the numerals 1 and 2 indicate two parallel arms of a welding machine not otherwise shown. Rotatably mounted on said arms 1 and 2 are two electrodes in the shape of rollers 3 and 4, respectively. The arm 1 also supports a slit clamping jaw 5 which carries a journal pin 6 extending at right angles to the axis of arm 1. The jaw 5 may be displaced along the arm 1 and locked in the desired position by being clamped therearound by tightening a threaded bolt 7, extending across the slit of the jaw, as shown in Fig. 2. The reference numeral 8 designates a disc for a labyrinth packing which is provided on its one surface with a set of axially projecting concentric, annular ribs 9. In its centre the disc 8 has a boring for receiving the journal 6. The applying and securing of a sealing band to the circular top surface of such a rib is effected as follows:

The labyrinth disc 8 is placed on the journal pin 6 and the clamping jaw 5 is adjusted along the arm 1 til one of the ribs 9, as for instance, the outermost one, enters into between the electrode rollers 3 and 4, as shown in Fig. 1. The sealing band 10 is unrolled from a magazine 11, Fig. 2, and passed through a braking device 12 where the band is stretched by the aid of jaws, screws 13 and springs, and thence the band is passed over the roller 3. The roller 3 is driven from a motor 14 via a transmission gear 15. The rollers 3 and 4 engage the labyrinth disc on opposite sides thereof, so that the disc is caused to revolve by the rotation of roller 3 and rotates in its turn the roller 4. According as the disc revolves the band is deposited by the rotating roller 3 onto the top surface of the rib in contact therewith and immediately welded thereto by a spot or seam welding operation effected with the use of the rollers 3 and 4 as electrodes. The roller 4 in the example shown acts as a support, but it is within the scope of the invention to positively drive the roller 4 instead of roller 3, or to drive both rollers. After the circular top surface of the rib has been covered by the sealing band along its entire circumference, the clamping jaw 5 with the disc 8 is displaced—to the left in Fig. 1—so as to bring another rib into position between the electrode rollers.

In order to prevent the band from sliding outwards during its bending to a circular shape corresponding to that of the rib, the roller 3 may be provided with a guiding edge, as indicated at 16 in Fig. 3.

As the said bending of the band to circular shape is an edgewise bending operation, that is to say, a bending of the band in its own plane, there is a tendency for the inner edge portion of the band towards becoming wave-shaped. In order to suppress this tendency and make band even over its entire area, there may be provided a sliding shoe, as shown at 17 in Fig. 3. Said sliding shoe is so positioned with relation to the cylindrical surface of the roller 3 that the said inner edge portion of the band will be drawn between it and the cylindrical surface of the roller 3 with a resulting smoothing out of the edge portion. Instead of a sliding shoe a small roller may be used mounted on an arm of such a curved shape and such dimensions that there will be room enough to receive it in the space between two projections 9.

It is to be noted that both the sliding shoe 17 and the clamping jaw 5 must be electrically insulated against their respective supporting members.

We claim:

1. A mechanism for applying radially projecting sealing bands to axially projecting concentric, annular ribs of labyrinth packing discs comprising in combination, a sealing band magazine, two welding electrodes in the shape of rotatably mounted rollers having parallel axes of rotation and situated with their circumferential surfaces opposite each other, members for rotatably supporting said rollers, means for positively driving one of said rollers at least for allowing it to unroll the band from said magazine, adjustable means including a journal pin at right angles to the axes of rotation of the rollers for rotatably supporting a labyrinth disc in such a way as to permit introduction of the disc with any desired rib thereof into between the rollers for bringing the circular surface of said rib into contact with the band as unrolled by a roller and allow welding of the band to the top surface of the rib according as it is deposited onto said surface.

2. A mechanism as claimed in claim 1, characterized by the further feature that the roller from which the band is deposited onto the circular top surface of a rib, is provided with a guiding edge for preventing outward sliding motion of the band during the deposition thereof.

3. A mechanism as claimed in claim 1, characterized by the further feature that the journal pin for rotatably supporting a disc undergoing treatment is adjustably mounted at the member for supporting one of the rollers.

4. A mechanism as claimed in claim 1 and in which the roller for depositing the band onto the rib under treatment is provided with a lateral guiding edge for the band, characterized by the provision of means for effecting in conjunction with said roller a smoothing of the inner edge portion of the band while undergoing bending to the circular shape corresponding to that of the rib.

PER GOTTFRID LANGE.
RAGNAR OLOV JACOB MÖLLER.

References Cited in the file of this patent

UNITED STATES PATENTS

| Number | Name | Date |
|---|---|---|
| 1,565,012 | Jones | Dec. 8, 1925 |
| 2,481,087 | Crise | Sept. 6, 1947 |